United States Patent
Hebiguchi et al.

(10) Patent No.: US 8,639,185 B2
(45) Date of Patent: Jan. 28, 2014

(54) COMMUNICATION SYSTEM FOR WIDEBAND COMMUNICATIONS USING TRANSMISSION MEDIUM

(75) Inventors: Hiroyuki Hebiguchi, Miyagi-ken (JP); Shigetoshi Matsuta, Miyagi-ken (JP); Masaru Koishi, Miyagi-ken (JP); Hideyuki Nebiya, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 226 days.

(21) Appl. No.: 13/206,332

(22) Filed: Aug. 9, 2011

(65) Prior Publication Data
US 2011/0294420 A1 Dec. 1, 2011

Related U.S. Application Data

(63) Continuation of application No. PCT/JP2009/066440, filed on Sep. 18, 2009.

(30) Foreign Application Priority Data

Mar. 26, 2009 (JP) ................................ 2009-076417

(51) Int. Cl.
*H04B 5/00* (2006.01)

(52) U.S. Cl.
USPC .......... 455/41.1; 455/41.2; 455/41.3; 455/88; 455/100; 455/114.2

(58) Field of Classification Search
USPC .......... 375/264, 286; 370/468, 464; 455/41.1, 455/41.2, 41.3, 114.2, 100, 88
See application file for complete search history.

(56) References Cited

U.S. PATENT DOCUMENTS

| 5,796,827 | A | * | 8/1998 | Coppersmith et al. | ........ 713/182 |
| 5,914,701 | A | * | 6/1999 | Gersheneld et al. | .......... 345/156 |
| 6,104,913 | A | * | 8/2000 | McAllister | ................... 455/41.1 |

(Continued)

FOREIGN PATENT DOCUMENTS

| JP | 11-509380 | 8/1999 |
| JP | 2006-5444 | 1/2006 |

OTHER PUBLICATIONS

WidebandBand signalling for human body. IEEE journal by Seong-Jun Song, vol. 42 Sep. 2007.*

(Continued)

*Primary Examiner* — Temesgh Ghebretinsae
*Assistant Examiner* — MD Talukder
(74) *Attorney, Agent, or Firm* — Beyer Law Group LLP

(57) ABSTRACT

A communication system includes a transmitter that applies an electric field, obtained by modulating an information signal for wideband communication, to a transmission medium. The transmitter includes a transmission electrode, a transmission circuit that outputs the information signal for the wideband communication, and a first band controller that controls a band of the information signal for the wideband communication. When the transmission medium is in contact with the transmission electrode and the transmission medium and the transmission electrode are capacitively coupled to each other, the first band controller performs control to provide a band that is necessary for a receiver to perform demodulation for the wideband communication, and when the transmission medium is not in contact with the transmission electrode, the first band controller performs control to provide a narrower band than the band that is necessary for the wideband communication.

18 Claims, 10 Drawing Sheets

(56) References Cited

U.S. PATENT DOCUMENTS

| | | | |
|---|---|---|---|
| 6,223,018 B1* | 4/2001 | Fukumoto et al. | 455/41.1 |
| 8,253,693 B2* | 8/2012 | Buil et al. | 345/173 |
| 8,433,083 B2* | 4/2013 | Abolfathi et al. | 381/151 |
| 2001/0002924 A1* | 6/2001 | Tajima | 375/271 |
| 2003/0207668 A1* | 11/2003 | McFarland et al. | 455/3.01 |
| 2004/0092234 A1* | 5/2004 | Pohjonen | 455/91 |
| 2004/0219890 A1* | 11/2004 | Williams et al. | 455/100 |
| 2005/0260952 A1* | 11/2005 | Santhoff et al. | 455/88 |
| 2006/0092908 A1* | 5/2006 | Sung et al. | 370/347 |
| 2006/0126558 A1* | 6/2006 | Lee et al. | 370/329 |
| 2006/0136015 A1* | 6/2006 | Park et al. | 607/60 |
| 2007/0099589 A1* | 5/2007 | Kawai | 455/269 |
| 2007/0184788 A1* | 8/2007 | Minotani et al. | 455/117 |
| 2007/0211828 A1* | 9/2007 | Song et al. | 375/316 |
| 2008/0117117 A1* | 5/2008 | Washiro | 343/850 |
| 2008/0259043 A1* | 10/2008 | Buil et al. | 345/173 |
| 2008/0261523 A1* | 10/2008 | Kubono et al. | 455/41.1 |
| 2009/0291656 A1* | 11/2009 | Le Reverend et al. | 455/227 |
| 2010/0003917 A1* | 1/2010 | Hebiguchi et al. | 455/41.1 |
| 2010/0009628 A1* | 1/2010 | Hebiguchi | 455/41.1 |
| 2010/0142416 A1* | 6/2010 | Kim | 370/281 |
| 2010/0231353 A1* | 9/2010 | Haberli | 340/5.8 |
| 2010/0238955 A1* | 9/2010 | Sung et al. | 370/498 |
| 2010/0246643 A1* | 9/2010 | Lim et al. | 375/147 |
| 2010/0268091 A1* | 10/2010 | Takaoka | 600/478 |
| 2010/0304671 A1* | 12/2010 | Hebiguchi et al. | 455/41.1 |
| 2010/0315206 A1* | 12/2010 | Schenk et al. | 340/286.01 |
| 2010/0318420 A1* | 12/2010 | Park et al. | 705/14.49 |
| 2011/0021141 A1* | 1/2011 | Hebiguchi et al. | 455/41.1 |
| 2011/0294420 A1* | 12/2011 | Hebiguchi et al. | 455/41.1 |
| 2011/0294421 A1* | 12/2011 | Hebiguchi et al. | 455/41.1 |
| 2012/0002702 A1* | 1/2012 | Lakkis et al. | 375/130 |

OTHER PUBLICATIONS

Search Report dated Oct. 20, 2009 from International Application No. PCT/JP2009/066440.

* cited by examiner

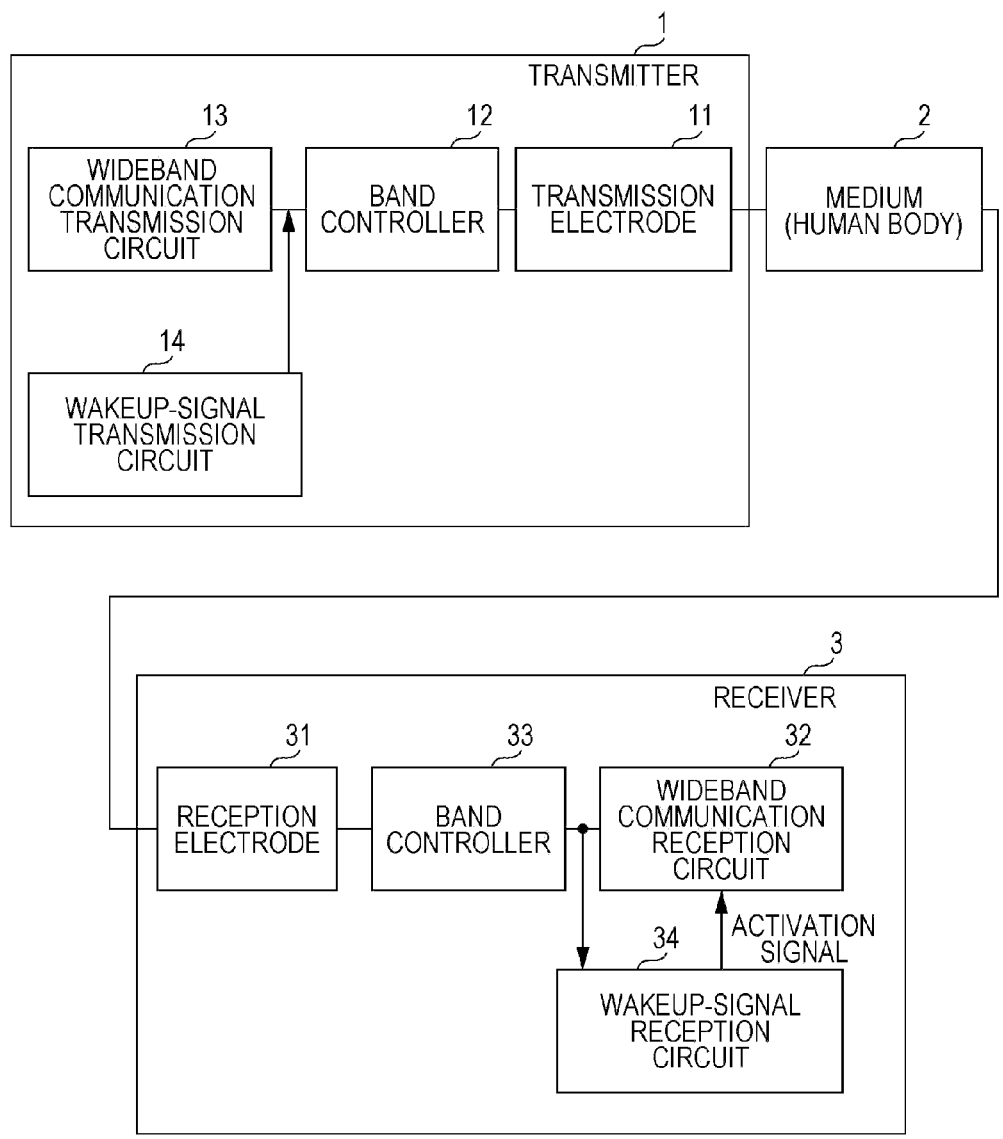

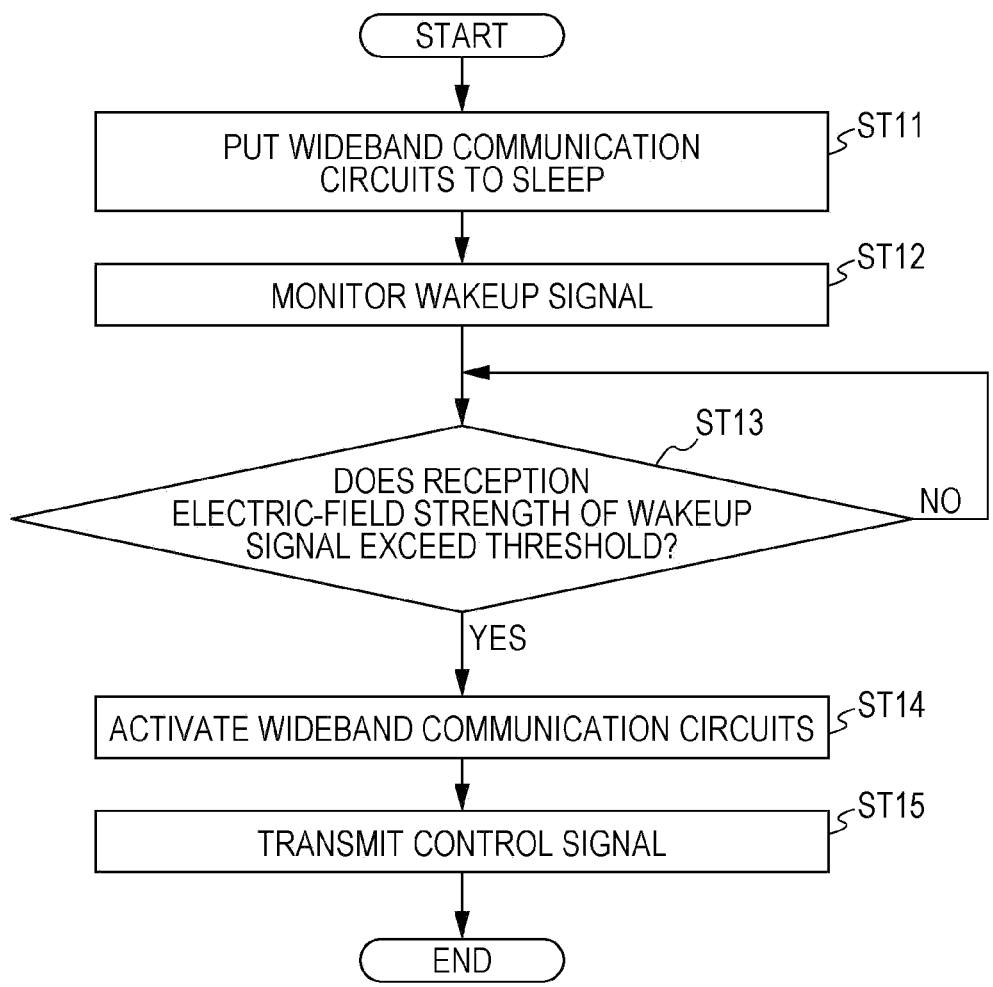

COMMUNICATION SYSTEM FOR WIDEBAND COMMUNICATIONS USING TRANSMISSION MEDIUM

CLAIM OF PRIORITY

This application is a Continuation of International Application No. PCT/JP2009/066440 filed on Sep. 18, 2009, which claims benefit of Japanese Patent Application No. 2009-076417 filed on Mar. 26, 2009. The entire contents of each application noted above are hereby incorporated by reference.

BACKGROUND OF THE INVENTION

1. Field of the Invention

The present invention relates to a communication system for performing transmission/reception via a transmission medium, such as a human body.

2. Description of the Related Art

In conjunction with technological development in recent years, a communication method using an electric field induced at a transmission medium, such as a human body, has been proposed as an entirely new communication system. One example of such a communication system is disclosed in Japanese Unexamined Patent Application Publication (Translation of PCT Application) No. 11-509380.

The scheme disclosed in Japanese Unexamined Patent Application Publication (Translation of PCT Application) No. 11-509380 features the ability to perform communication via a thin insulator since a signal is transmitted through capacitive coupling. On the other hand, when the transmission medium or an electrode also has a large area, the scheme has an aspect that the signal is transmitted upon approach to a certain distance even without contact.

However, when a large number of people use the above-described single communication system in a small area, a problem of crosstalk occurs because of the feature of the signal being transmitted even without contact. For applications for communicating ID (identification) information as various types of key, the signal being undesirably transmitted only upon approach is not preferable in terms of security.

In this electric-field communication technology, when both of the transmitter and the receiver are wearable equipment, it has been known that the communication becomes less tolerable to noise since only a very weak signal can be received. Japanese Unexamined Patent Application Publication (Translation of PCT Application) No. 11-509380 proposes use of spectral spreading for enhancing noise tolerance. The use of the spectral spreading improves the noise tolerance and also allows for demodulation even when the signal is slightly attenuated, but the feature of the signal being transmitted even without contact is also strengthened. Thus, the problem of error due to crosstalk and so on and the signal being undesirably transmitted are further emphasized. Accordingly, in the electric-field communication, there is no precedent for practical use of spectral spreading.

SUMMARY OF THE INVENTION

The present invention provides an easy-to-use communication system that enhances the communication quality by increasing the noise tolerance when in contact with the electrode and that prevents a signal from being undesirably transmitted when not in contact with the electrode.

A communication system of the present invention includes: a transmitter that applies an electric field to a transmission medium, the electric field being obtained by modulating an information signal for wideband communication; and a receiver that detects the electric field via the transmission medium and that obtains a demodulation signal corresponding to the information signal for the wideband communication. The transmitter includes a transmission electrode, a transmission circuit that outputs the information signal for the wideband communication, and a first band controller for controlling a band of the information signal for the wideband communication. When the transmission medium is in contact with the transmission electrode and the transmission medium and the transmission electrode are capacitively coupled to each other, the first band controller performs control to provide a band that is necessary for the receiver to perform demodulation for the wideband communication, and when the transmission medium is not in contact with the transmission electrode, the first band controller performs control to provide a narrower band than the band that is necessary for the receiver to perform demodulation for the wideband communication.

According to this configuration, when the transmission medium is not in contact with the transmission electrode, a signal in a narrower band than the band necessary for demodulation for the wideband communication is provided. Thus, even if interference with an adjacent electric-field communication system occurs, a signal communicated by the adjacent electric-field communication system is not demodulated and there is almost no influence on communication of the local system.

In the communication system of the present invention, preferably, the receiver has a reception electrode, a second band controller that controls a band of the information signal for the wideband communication, and a reception circuit that demodulates the information signal for the wideband communication. When the transmission medium is in contact with the reception electrode and the transmission medium and the reception electrode are capacitively coupled to each other, the second band controller may perform control to provide a band that is necessary for the receiver to perform demodulation for the wideband communication, and when the transmission medium is not in contact with the reception electrode, the second band controller may perform control to provide a narrower band than the band that is necessary for the receiver to perform demodulation for the wideband communication.

The present invention provides a communication system. The communication system includes: a transmitter that applies an electric field to a transmission medium, the electric field being obtained by modulating an information signal for wideband communication; and a receiver that detects the electric field via the transmission medium and that obtains a demodulation signal corresponding to the information signal for the wideband communication. The receiver includes a reception electrode, a second band controller for controlling a band of the information signal for the wideband communication, and a reception circuit that demodulates the information signal for the wideband communication. When the transmission medium is in contact with the reception electrode and the transmission medium and the reception electrode are capacitively coupled to each other, the second band controller performs control to provide a band that is necessary for the receiver to perform demodulation for the wideband communication, and when the transmission medium is not in contact with the reception electrode, the second band controller performs control to provide a narrower band than the band that is necessary for the receiver to perform demodulation for the wideband communication.

According to this configuration, since the receiver provides a signal in a narrower band than the band necessary for demodulation for the wideband communication, the possibility that interference with an adjacent electric-field communication system occurs is reduced.

In the communication system of the present invention, preferably, the first or second band controller has a resonator, and performs band control so that, when the transmission medium is in contact with the transmission electrode or the reception electrode and the transmission medium is capacitively coupled to the transmission electrode or the reception electrode, a Q factor of the resonator is relatively low, and when the transmission medium is not in contact with the transmission electrode or the reception electrode, the Q factor of the resonator is relatively high. In this configuration, when the transmission medium is not in contact with the transmission electrode or the reception electrode, the Q factor of the resonator increases to thereby make it possible to perform band control to provide a narrower band than the band necessary for demodulation for the wideband communication.

In the communication system of the present invention, preferably, the first or second band controller has a resonator, and performs band control so that, when the transmission medium is in contact with the transmission electrode or the reception electrode and the transmission medium is capacitively coupled to the transmission electrode or the reception electrode, a resonant frequency is relatively far from the frequency band necessary for demodulation for the wideband communication, and when the transmission medium is not in contact with the transmission electrode or the reception electrode, the resonant frequency is relatively close to the frequency band necessary for demodulation for the wideband communication. According to this configuration, when the transmission medium is not in contact with the transmission electrode or the reception electrode, the resonant frequency approaches a frequency band necessary for demodulation for the wideband communication and the gradient of a curve of output attenuation relative to a frequency change forms a steep region. This makes it possible to perform band control provide a narrower band than the band necessary for demodulation for the wideband communication.

In the communication system of the present invention, preferably, the first or second band controller has a resonator having multiple resonate peaks, and performs band control so that, when the transmission medium is in contact with the transmission electrode or the reception electrode and the transmission medium is capacitively coupled to the transmission electrode or the reception electrode, the resonator has the multiple resonate peaks in the vicinity of the frequency band necessary for demodulation for the wideband communication, and when the transmission medium is not in contact with the transmission electrode or the reception electrode, the number of resonant peaks that are present in the vicinity of the frequency band necessary for demodulation for the wideband communication is reduced. According to this configuration, when the transmission medium is not in contact with the transmission electrode or the reception electrode, the number of resonant peaks that are present in the vicinity of the frequency band necessary for demodulation for the wideband communication decreases. This makes it possible to perform band control to provide a narrower band than the band necessary for demodulation for the wideband communication.

In the communication system of the present invention, preferably, the first or second band controller has a resonator having multiple resonate peaks, and performs band control so that, when the transmission medium is in contact with the transmission electrode or the reception electrode and the transmission medium is capacitively coupled to the transmission electrode or the reception electrode, resonant frequencies of the resonant peaks in the frequency band necessary for demodulation for the wideband communication are relatively far, and when the transmission medium is not in contact with the transmission electrode or the reception electrode, the resonant frequencies of the multiple resonant peaks in the frequency band necessary for demodulation for the wideband communication are relatively close. According to this configuration, when the transmission medium is not in contact with the transmission electrode or the reception electrode, the resonant frequencies of the resonant peaks in the frequency band necessary for demodulation for the wideband communication are close. This makes it possible to perform band control to provide a narrower band than the band necessary for demodulation for the wideband communication.

In the communication system of the present invention, preferably, the transmitter has a wakeup-signal transmission circuit that transmits a wakeup-signal controlled to be in a narrower band than the band necessary for demodulation for the wideband communication, and the receiver has a wakeup-signal reception circuit that monitors whether or not a reception electric-field strength of the wakeup signal exceeds a predetermined threshold and that activates the reception circuit when the reception electric-field strength exceeds the predetermined threshold.

The communication system of the present invention includes: a transmitter that applies an electric field to a transmission medium, the electric field being obtained by modulating an information signal for wideband communication; and a receiver that detects the electric field via the transmission medium and that obtains a demodulation signal corresponding to the information signal for the wideband communication. The transmitter includes a transmission electrode, a transmission circuit that outputs the information signal for the wideband communication, and a first band controller for controlling a band of the information signal for the wideband communication. When the transmission medium is in contact with the transmission electrode and the transmission medium and the transmission electrode are capacitively coupled to each other, the first band controller performs control to provide a band that is necessary for the receiver to perform demodulation for the wideband communication, and when the transmission medium is not in contact with the transmission electrode, the first band controller performs control to provide a narrower band than the band that is necessary for the receiver to perform demodulation for the wideband communication. With this arrangement, the communication system is an easy-to-use communication system that enhances the communication quality by increasing the noise tolerance when in contact with the electrode and that prevents a signal from being undesirably transmitted when not in contact with the electrode.

BRIEF DESCRIPTION OF THE DRAWINGS

FIG. 10 is a schematic block diagram showing a communication system according to a sixth embodiment of the present invention;

FIG. 12 is a flow diagram illustrating a wakeup function in the communication system according to the sixth embodiment of the present invention.

DESCRIPTION OF THE PREFERRED EMBODIMENTS

Embodiments of the present invention will be described below in detail with reference to the accompanying drawings. Wideband communication utilizing spectrum spreading will be described as wideband communication in the embodiments described below.

(First Embodiment)

Figure 1:
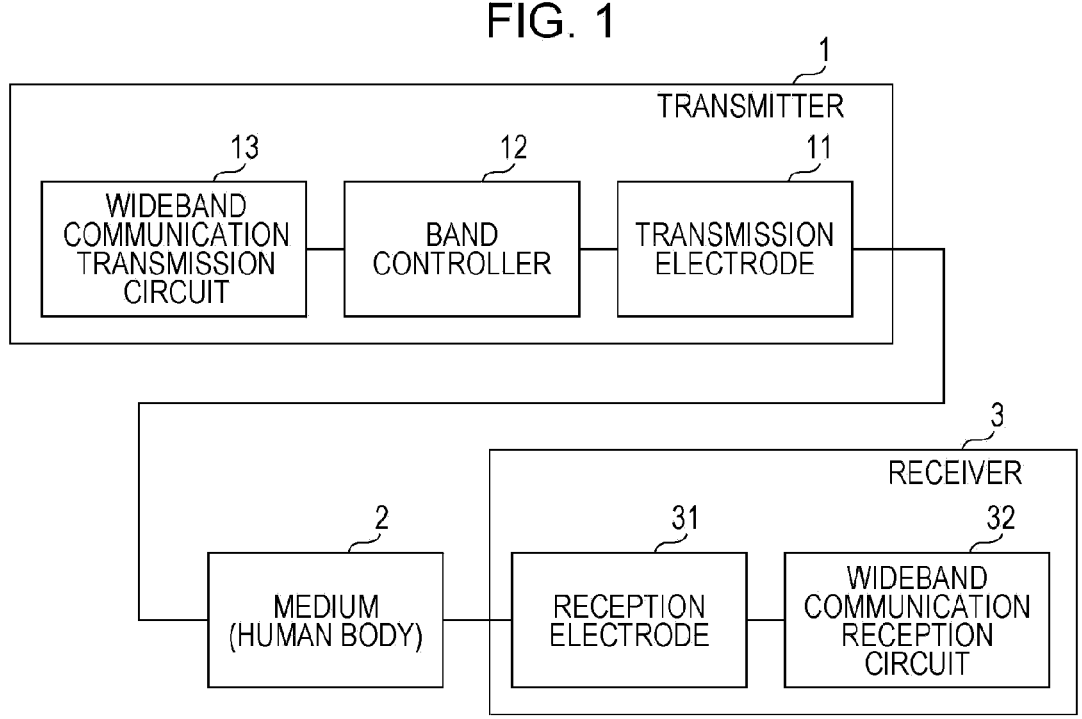
FIG. 1 is a schematic block diagram showing a communication system according to a first embodiment of the present invention.

FIG. 1 is a schematic block diagram showing a communication system according to an embodiment of the present invention. The communication system shown in FIG. 1 mainly includes a transmission medium 2, a transmitter 1, and a receiver 3. The transmission medium 2 is, for example, a human body and transmits an information signal via an electric field. The transmitter 1 gives an electric field, obtained by modulating an information signal, to the transmission medium 2. The receiver 3 detects the electric field via the transmission medium 2 and demodulates the electric field into the information signal.

In the communication system, the transmitter 1 and the transmission medium (in this case, a human body) 2 are capacitively coupled to each other and the receiver 3 and the transmission medium (in this case, the human body) 2 are capacitively coupled to each other so as to transmit an information signal via an electric field obtained by modulating the information signal. In this case, although a displacement current flows through the transmission medium, no steady current flows therethrough. Thus, the transmission medium does not need to be electrically continuous. Thus, for example, even while the transmitter is in the user's pocket, the transmitter and the transmission medium are capacitively coupled to each other via thin cloth, thus making is possible to transmit the information signal.

Figure 2:
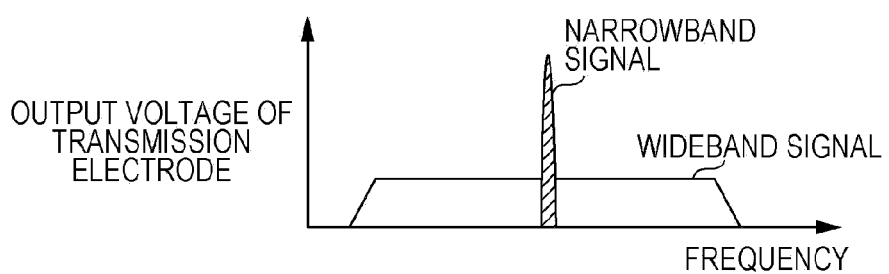
FIG. 2 is a graph illustrating a feature of the communication system according to the present invention.

The transmitter 1 gives an electric field, obtained by modulating an information signal, to the transmission medium 2. The transmitter 1 mainly includes a transmission electrode 11, a band controller 12, and a wideband communication transmission circuit 13. The transmission electrode 11 faces the transmission medium 2 to give an electric field to the transmission medium 2. The wideband communication transmission circuit 13 includes a modulation circuit and a conversion circuit. The modulation circuit modulates a carrier for ASK (amplitude shift keying), FSK (frequency shift keying), BPSK (binary phase shift keying), or the like by using the information signal. The conversion circuit amplifies the modulation signal and converts the amplified signal into a voltage change. The modulation circuit also includes a spread modulation circuit for performing spread-spectrum modulation on the information signal. Performing spread-spectrum modulation on an information signal in such a manner makes it possible to generate an information signal for wideband communication, as shown in FIG. 2. It is also possible to generate the signal for the wideband communication by performing spread-spectrum modulation on a baseband signal, without performing modulation using a carrier.

The band controller 12 controls the band of the information signal for the wideband communication. More specifically, when the transmission medium 2 is in contact with the transmission electrode 11 and the transmission medium 2 and the transmission electrode 11 are capacitively coupled to each other, the band controller 12 performs control to provide a band that is necessary for the receiver 3 to perform demodulation for the wideband communication, and when the transmission medium 2 is not in contact with the transmission electrode 11, the band controller 12 performs control to provide a narrower band than the band that is necessary for the receiver 3 to perform demodulation for the wideband communication. That is, when the transmission medium 2 is not in contact with the transmission electrode 11, the band controller 12 converts a wideband signal as shown in FIG. 2, the wideband signal being generated by the wideband communication transmission circuit 13, into a narrowband signal (a signal in a narrowband at a level that cannot be demodulated by the receiver 3).

The receiver 3 detects the electric field via the transmission medium 2 to obtain a demodulation signal corresponding to the information signal. The receiver 3 may have a reception electrode 31 and a wideband communication reception circuit 32. The reception electrode 31 faces the transmission medium 2 to receive the electric field from the transmission medium 2. The wideband communication reception circuit 32 includes a detection circuit for detecting the electric field through amplification and a demodulation circuit for demodulating the information signal by using the detected physical quantity.

For communication in the communication system having the above-described configuration, when the transmission medium 2 is in contact with the transmission electrode 11, the wideband communication transmission circuit 13 in the transmitter 1 obtains a modulation signal by modulating a carrier with an information signal, the carrier having frequencies (several tens of kHz to several tens of MHz) at which the human body that is the transmission medium 2 exhibits conductivity, and further performs spread-spectrum modulation on the modulation signal to obtain a signal for wideband communication. The signal is amplified and is converted into a voltage change. Upon application of the voltage change to the transmission electrode 11 of the transmitter 1, an electric field corresponding to the modulation signal is generated around the transmission electrode 11. The electric field is then given to the human body. The electric field given to the human body is received by the reception electrode 31 in the receiver 3. When the electric field is applied to the reception electrode 31, the wideband communication reception circuit 32 detects the modulation signal and obtains the information signal through demodulation using the carrier used by the transmitter 1. In such a manner, the human body can be used as the transmission medium 2 to transmit/receive the information signal. With respect to the transmission electrode 11, communication can be performed even when the surface thereof is covered with an insulator.

On the other hand, when the transmission medium 2 is not in contact with the transmission electrode 11, the wideband communication transmission circuit 13 in the transmitter 1 obtains a modulation signal by modulating a carrier with an information signal, the carrier having frequencies (several tens of kHz to several MHz) at which the human body that is the transmission medium 2 exhibits conductivity, and the band controller 12 converts the modulation signal into a signal as shown in FIG. 2, the signal in a narrow band at a level that cannot be demodulated by the receiver 3. The signal is amplified and is converted into a voltage change. Upon application of the voltage change to the transmission electrode 11 of the transmitter 1, an electric field corresponding to the modulation signal is generated around the transmission electrode 11. The electric field is then given to the human body. The electric field given to the human body is received by the reception electrode 31 in the receiver 3. When the electric field is applied to the reception electrode 31, the wideband communication reception circuit 32 detects the modulation signal and demodulates the detected modulation signal by using the carrier used by the transmitter 1. However, the modulation signal has become a signal in a narrow band at a level that cannot be demodulated by the receiver 3. Thus, the receiver 3 cannot reproduce the information signal. When a baseband signal is spread-spectrum modulated, the resulting signal similarly has a narrow band at a level that cannot be demodulated (despread) and thus is not reproduced. Thus, the information signal cannot be obtained.

As described above, when the transmission medium 2 is not in contact with the transmission electrode 11, the transmitter 1 performs band control to provide a signal in a narrow band at a level that cannot be demodulated by the receiver 3. Thus, even in a case in which multiple electric-field communication systems are installed at a short distance, when the transmission medium 2 is away from the transmission electrode 11, a signal of the adjacent electric-field communication system cannot be demodulated. This makes it possible to prevent interference with the adjacent electric-field communication system and also makes it possible to prevent occurrence of error and malfunction. That is, when the transmission medium 2 is not in contact with the transmission electrode 11, a signal in a narrower band than the band necessary for demodulation for the wideband communication is provided. Thus, even if interference with the adjacent electric-field communication system occurs, a signal communicated by the adjacent electric-field communication system is not demodulated and there is almost no influence on communication of the local system.

Figure 3A:
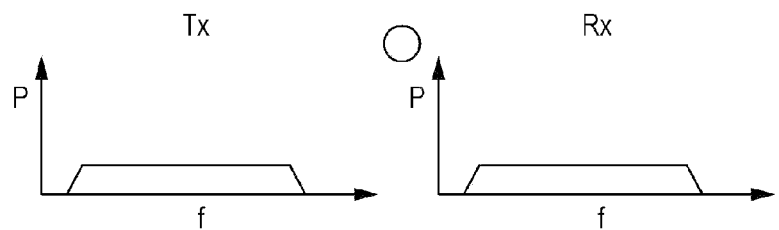
FIGS. 3A to 3D are graphs showing a relationship between a reception electric-field strength and a frequency when in contact with a transmission medium in the communication system according to the first embodiment of the present invention.
Figure 3B:
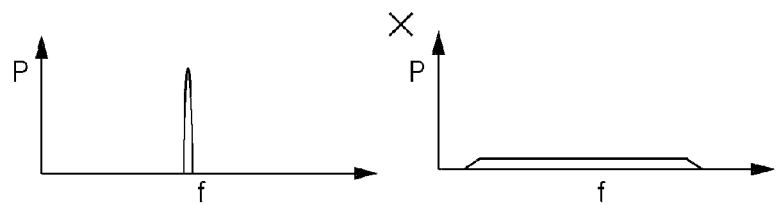
Figure 3C:
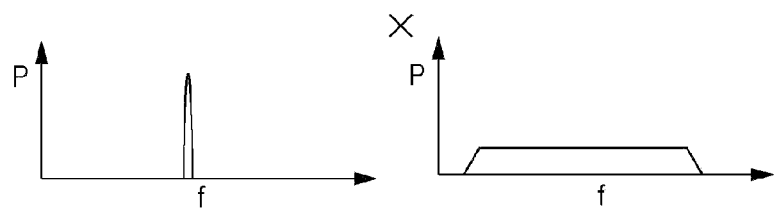
Figure 3D:
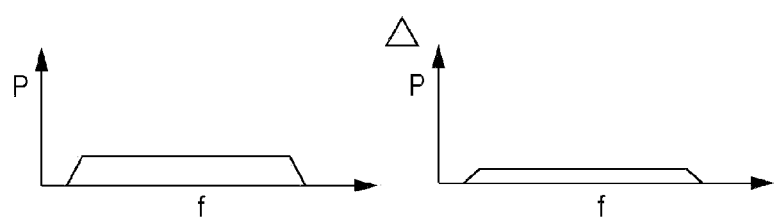

In this communication system, when the transmission medium 2 comes into contact with both the transmission electrode 11 and the reception electrode 31, the transmitter 1 does not perform band control for obtaining a signal in a narrow band at a level that cannot be demodulated by the receiver 3. Thus, as shown in FIG. 3A, the transmitter 1 and the receiver 3 transmit/receive a signal for wideband communication to allow the wideband communication (indicated by ○). When the transmission medium 2 moves away from both of the transmission electrode 11 and the reception electrode 31, the band controller 12 in the transmitter 1 performs band limitation to obtain a signal in a narrow band at a level that cannot be demodulated by the receiver 3. Consequently, as shown in FIG. 3B, the receiver 3 cannot demodulate the signal for the wideband communication and cannot perform the wideband communication (indicated by x). When the transmission medium 2 moves away from only the transmission electrode 11, the band controller 12 in the transmitter 1 performs band limitation to obtain a signal in a narrow band at a level that cannot be demodulated by the receiver 3. Thus, as shown in FIG. 3C, the receiver 3 cannot demodulate the signal for the wideband communication and cannot perform the wideband communication (indicated by x). When the transmission medium 2 moves away from only the reception electrode 31, the transmitter 1 and the receiver 3 do not perform the band limitation. Thus, as shown in FIG. 3D, although wideband communication is possible, the band is not at a level at which an information signal can be practically transmitted (indicated by Δ).

In such a communication system, wideband communication can be efficiently disconnected when the transmission medium 2 moves away from the transmitter 1. In such a communication system, since the receiver has no band controller, wideband communication is possible even when the receiver 3 is away from the transmission medium 2 to some extent. In FIGS. 3A to 3D, the vertical axis indicates the strength of a signal transmitted/received and the horizontal axis indicates a frequency.

This communication system is used is, for example, a case in which information from information providing equipment (a transmitter) that provides information the user desires to obtain is received into a memory in equipment (a receiver) in his/her possession, for example, in his/her pocket. In such a case, for example, when the user wearing the receiver touches the electrode of the information providing equipment, which is the transmitter, with his/her hand or when the user wearing the receiver steps on the electrode of the information providing equipment, which is the transmitter installed on a floor, information can be stored in the memory. Specifically, this is effective for a case in which information regarding pictures is obtained at a gallery or the like and a case in which information of a product description or pamphlet is obtained at an exhibition or the like.

Figure 4A:
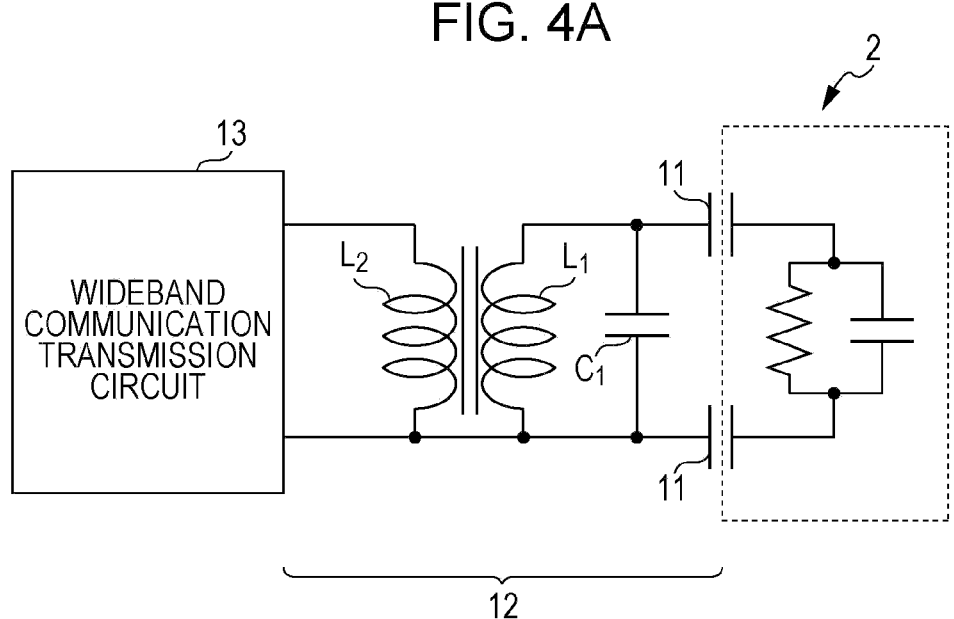
FIG. 4A is a diagram showing an equivalent circuit of a portion of a transmitter side in the communication system according to the first embodiment of the present invention and FIG. 4B is a graph showing a relationship between a frequency and an output of the transmitter in the communication system according to the first embodiment of the present invention.
Figure 4B:
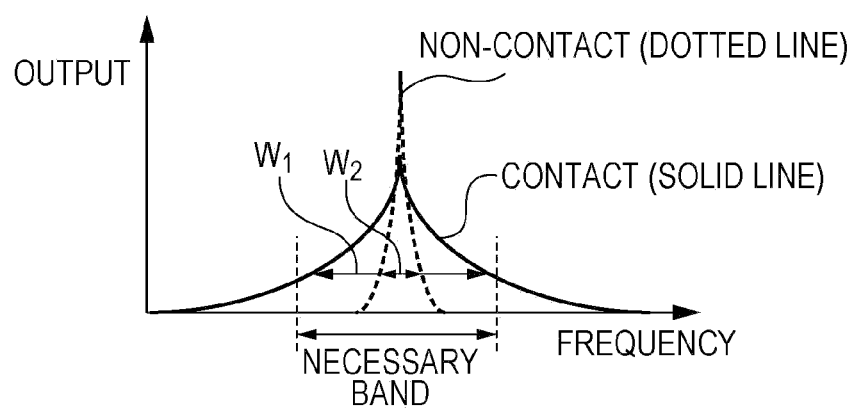

Next, a description will be given of the band controller 12 in the transmitter in the communication system according to the embodiment of the present invention. FIG. 4A is a diagram showing an equivalent circuit of a portion of the transmitter side in the communication system according to the first embodiment of the present invention and FIG. 4B is a graph showing a relationship between a frequency and an output of the transmitter in the communication system according to the first embodiment of the present invention.

When resistance appears to be dominant as a load during capacitive coupling of the transmission medium 2 to the transmission electrode 11, the band controller 12 can be configured as shown in FIG. 4A. In such a configuration, when the transmission medium 2 is not in contact with the transmission electrode 11, the Q (quality) factor of a resonator increases to thereby make it possible to perform band control to obtain a narrower band than the band necessary for demodulation for the wideband communication. That is, in such a configuration, when the transmission medium 2 is not capacitively coupled to the transmission electrode 11 (i.e., when the transmission medium 2 is not in contact with the transmission electrode 11), an inductor L1 and a capacitor C1 together resonate, the Q factor of the band controller 12 increases, and the band of the transmission signal is narrowed (Non-Contact (a dotted line): a bandwidth W2, in FIG. 4B. On the other hand, when the transmission medium 2 is capacitively coupled to the transmission electrode 11 (i.e., when the transmission medium 2 is in contact with the transmission electrode 11), the resistance of the transmission medium 2 reduces the Q factor of the band controller 12 to widen the band of the transmission signal (Contact (a solid line): a bandwidth W1, in FIG. 4B.

(Second Embodiment)

Figure 5A:
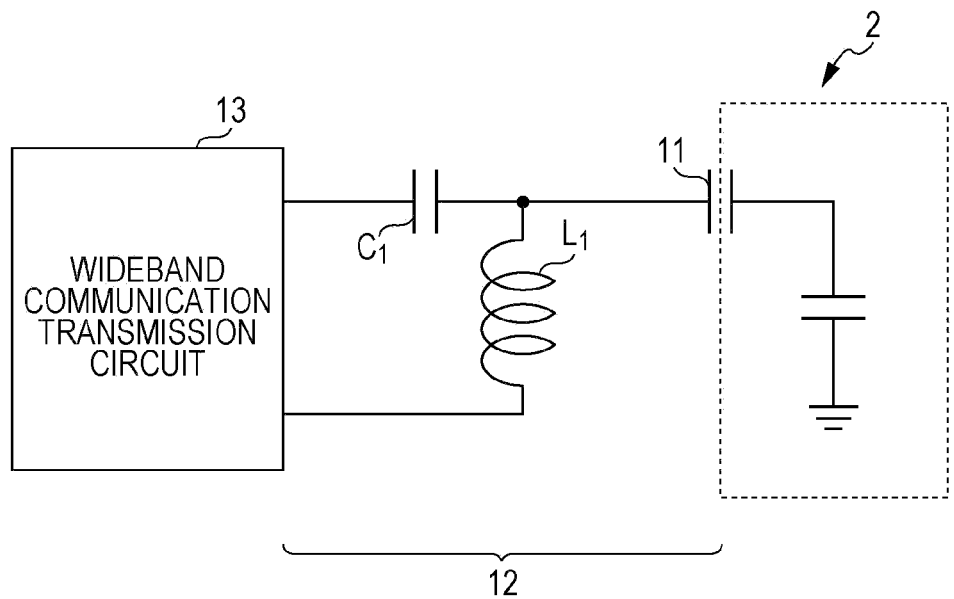
FIG. 5A is a diagram showing an equivalent circuit of a portion of a transmitter side in a communication system according to a second embodiment of the present invention and FIG. 5B is a graph showing a relationship between a frequency and an output of the transmitter in the communication system according to the second embodiment of the present invention.
Figure 5B:
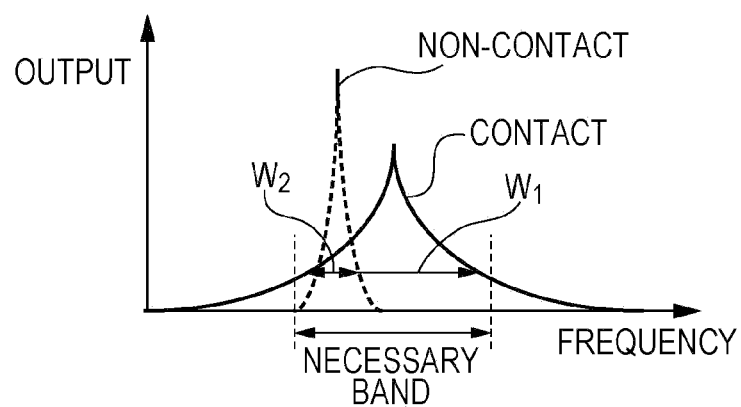

FIG. 5A is a diagram showing an equivalent circuit of a portion of a transmitter side in a communication system according to a second embodiment of the present invention and FIG. 5B is a graph showing a relationship between a frequency and an output of the transmitter in the communication system according to the second embodiment of the present invention.

When capacitance appears to be dominant as a load during capacitive coupling of the transmission medium 2 to the transmission electrode 11, the band controller 12 can be configured as shown in FIG. 5A. In such a configuration, when the transmission medium 2 is not in contact with the transmission electrode 11, the Q factor of the resonator increases to thereby make it possible to perform band control to provide a narrower band than the band necessary for demodulation for the wideband communication. That is, in such a configuration, when the transmission medium 2 is not capacitively coupled to the transmission electrode 11 (i.e., when the transmission medium 2 is not in contact with the transmission electrode 11), an inductor L1 and a capacitor C1 together resonate in series, the Q factor of the band controller 12 increases to narrow the band of the transmission signal (Non-Contact (a dotted line): a bandwidth W2, in FIG. 5B). On the other hand, when the transmission medium 2 is capacitively coupled to the transmission electrode 11 (i.e., when the transmission medium 2 is in contact with the transmission electrode 11), the capacitance of the transmission medium 2 reduces the Q factor of the band controller 12 to widen the band of the transmission signal (Contact (a solid line): a bandwidth W1, in FIG. 5B).

(Third Embodiment)

Figure 6A:
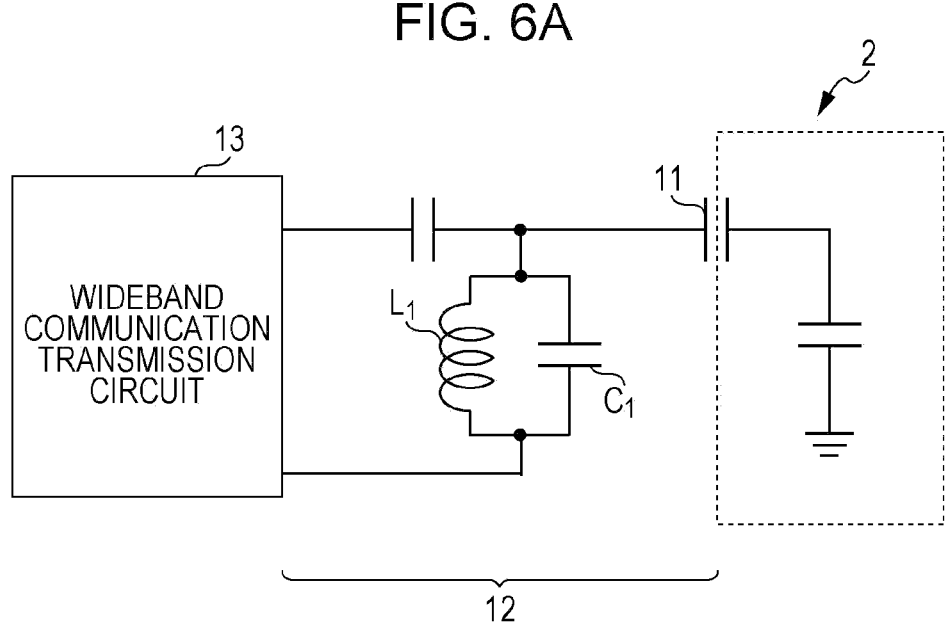
FIG. 6A is a diagram showing an equivalent circuit of a portion of a transmitter side in a communication system according to a third embodiment of the present invention and FIG. 6B is a graph showing a relationship between a frequency and an output of the transmitter in the communication system according to the third embodiment of the present invention.
Figure 6B:
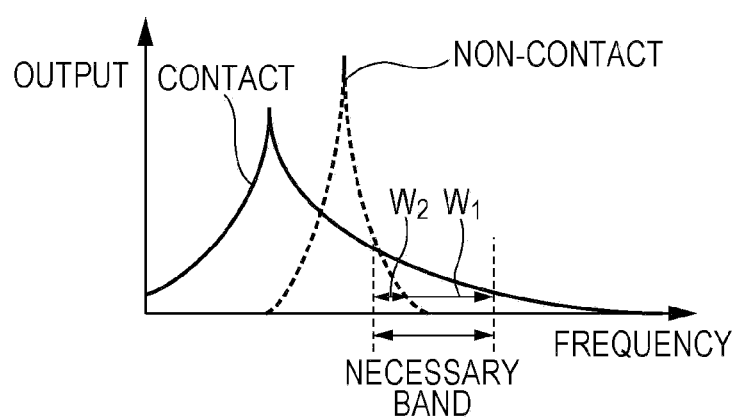

FIG. 6A is a diagram showing an equivalent circuit of a portion of the transmitter side in a communication system according to a third embodiment of the present invention and FIG. 6B is a graph showing a relationship between a frequency and an output of the transmitter in the communication system according to the third embodiment of the present invention.

When capacitance appears to be dominant as a load during capacitive coupling of the transmission medium 2 to the transmission electrode 11, the band controller 12 can be configured as shown in FIG. 6A. In such a configuration, when the transmission medium 2 is not in contact with the transmission electrode 11, the resonant frequency approaches a frequency band necessary for demodulation for the wideband communication and the gradient of the curve of output attenuation relative to the frequency change forms a steep region. This makes it possible to perform band control provide a narrower band than the band necessary for demodulation for the wideband communication. That is, in such a configuration, when the transmission medium 2 is not capacitively coupled to the transmission electrode 11 (i.e., when the transmission medium 2 is not in contact with the transmission electrode 11), the inductor L1 and the capacitor C1 together resonate in parallel. Since the resonant frequency is present near the necessary band and a steep gradient region in which the output attenuates depending on the frequency is formed, the band in which the output is within a predetermined range is narrowed (Non-Contact (a dotted line): a bandwidth W2, in FIG. 6B). On the other hand, when the transmission medium 2 is capacitively coupled to the transmission electrode 11 (i.e., when the transmission medium 2 is in contact with the transmission electrode 11), the capacitance of the transmission medium 2 causes the resonant frequency to shift away from the necessary band to form a gentle gradient region in which the output attenuates depending on the frequency. Thus, the band in which the output is within a predetermined range is widened (Contact (a solid line): a bandwidth W1, in FIG. 6B).

(Fourth Embodiment)

Figure 7A:
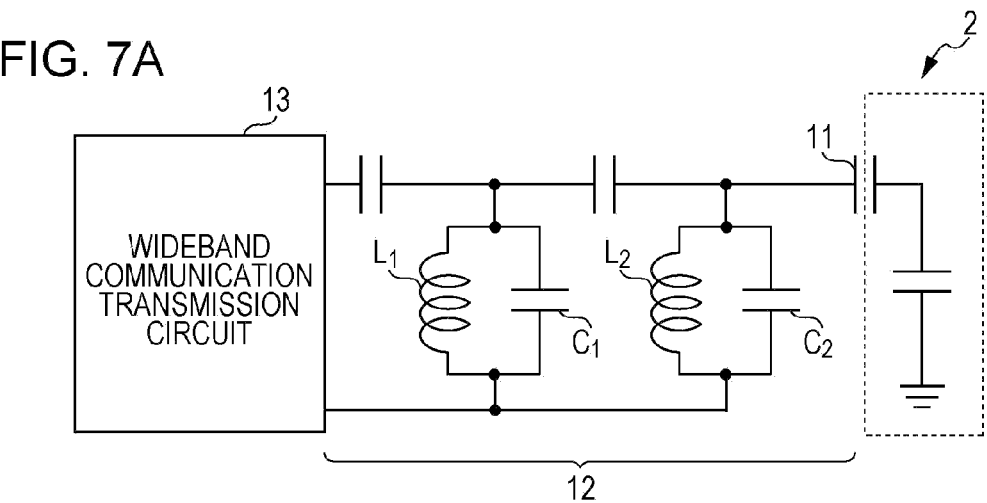
FIG. 7A is a diagram showing an equivalent circuit of a portion of a transmitter side in a communication system according to a fourth embodiment of the present invention and FIGS. 7B to 7D are graphs each showing a relationship between a frequency and an output of the transmitter in the communication system according to the fourth embodiment of the present invention.
Figure 7B:
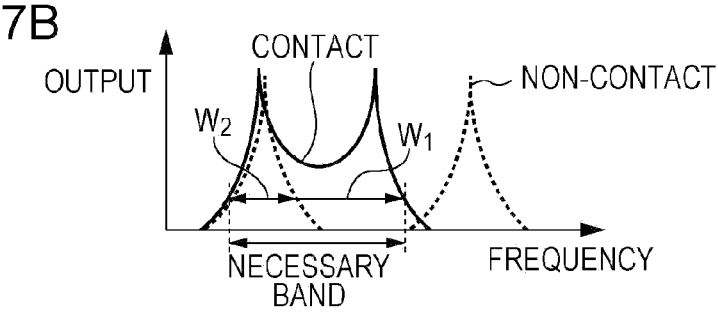
Figure 7C:
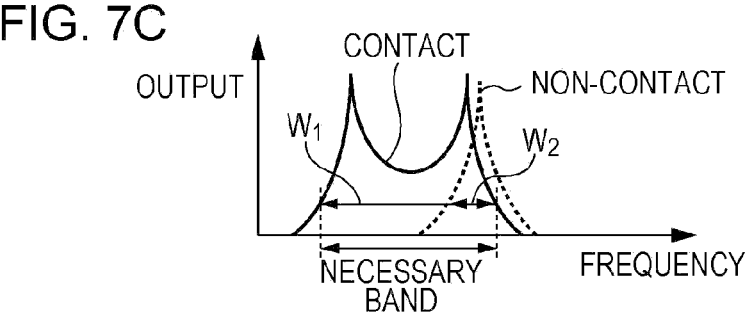
Figure 7D:
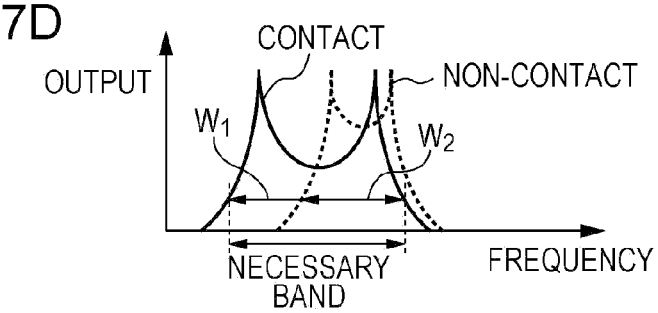

FIG. 7A is a diagram showing an equivalent circuit of a portion of a transmitter side in a communication system according to a fourth embodiment of the present invention and FIGS. 7B to 7D are graphs each showing a relationship between a frequency and an output of the transmitter in the communication system according to the fourth embodiment of the present invention.

When capacitance appears to be dominant as a load during capacitive coupling of the transmission medium 2 to the transmission electrode 11, the band controller 12 can be configured as shown in FIG. 7A. In such a configuration, left resonance is due to the inductor L1 and the capacitor C1 and right resonance is due to an inductor L2 and a capacitor C2. In such a configuration, when the transmission medium 2 is not in contact with the transmission electrode 11, the number of resonant peaks that are present in the vicinity of the frequency band necessary for demodulation for the wideband communication decreases, as shown in FIG. 7B. This makes it possible to perform band control to provide a narrower band than the band necessary for demodulation for the wideband communication. That is, in such a configuration, as shown in FIG. 7B, when the transmission medium 2 is not capacitively coupled to the transmission electrode 11 (i.e., when the transmission medium 2 is not in contact with the transmission electrode 11), the resonance due to the inductor L2 and the capacitor C2 shifts greatly toward higher frequencies than the necessary band, as indicated by a dotted line (Non-Contact (a dotted line): a bandwidth W2, in FIG. 7B). On the other hand, when the transmission medium 2 is capacitively coupled to the transmission electrode 11 (i.e., when the transmission medium 2 is in contact with the transmission electrode 11), the capacitance of the transmission medium 2 causes the resonant frequency of the inductor L2 and the capacitor C2 to decrease to come into the necessary band, as indicated by a solid line (Contact (a solid line): a bandwidth W1, in FIG. 7B). In such a manner, it is possible to control an increase/ decrease in the number of resonant peaks that are present in the vicinity of the frequency band necessary for demodulation for the wideband communication.

Similarly, through a change in a circuit constant in a configuration as shown in FIG. 7A for the band controller 12, an operation as described below is also possible. For example, as shown in FIG. 7C, when the transmission medium 2 is not capacitively coupled to the transmission electrode 11 (i.e., when the transmission medium 2 is not in contact with the transmission electrode 11), two resonant frequencies overlap each other to appear as a single peak, as indicted by a dotted line (Non-Contact (a dotted line): a bandwidth W2, in FIG. 7C). On the other hand, when the transmission medium 2 is capacitively coupled to the transmission electrode 11 (i.e., when the transmission medium 2 is in contact with the transmission electrode 11), the capacitance of the transmission medium 2 causes the resonant frequency of the inductor L2 and the capacitor C2 to decrease to form two peaks in the necessary band, as indicated by a solid line (Contact (a solid line): a bandwidth W1, in FIG. 7C).

An operation as described below is also possible. As shown in FIG. 7D, even when the transmission medium 2 is not capacitively coupled to the transmission electrode 11 (i.e., when the transmission medium 2 is not in contact with the transmission electrode 11), two peaks are present in the necessary band (Non-Contact (a dotted line): a bandwidth W2, in FIG. 7D). When the transmission medium 2 is capacitively coupled to the transmission electrode 11 (i.e., when the transmission medium 2 is in contact with the transmission electrode 11), the gap between the two peaks increases (Contact (a solid line): a bandwidth W1, in FIG. 7D).

In a case as shown in FIG. 7C or 7D, when the transmission medium 2 is not in contact with the transmission electrode 11, it is also possible to perform band control to provide a narrower band than the band necessary for demodulation for the wideband communication.

(Fifth Embodiment)

Although a case in which the transmitter performs band control has been described in the first to fourth embodiments described above, the receiver may also be configured so as to make, when the transmission medium moves away from the receiver, the passband of a filter unit including the reception electrode narrower than the band necessary for spread spectrum demodulation.

Figure 8:
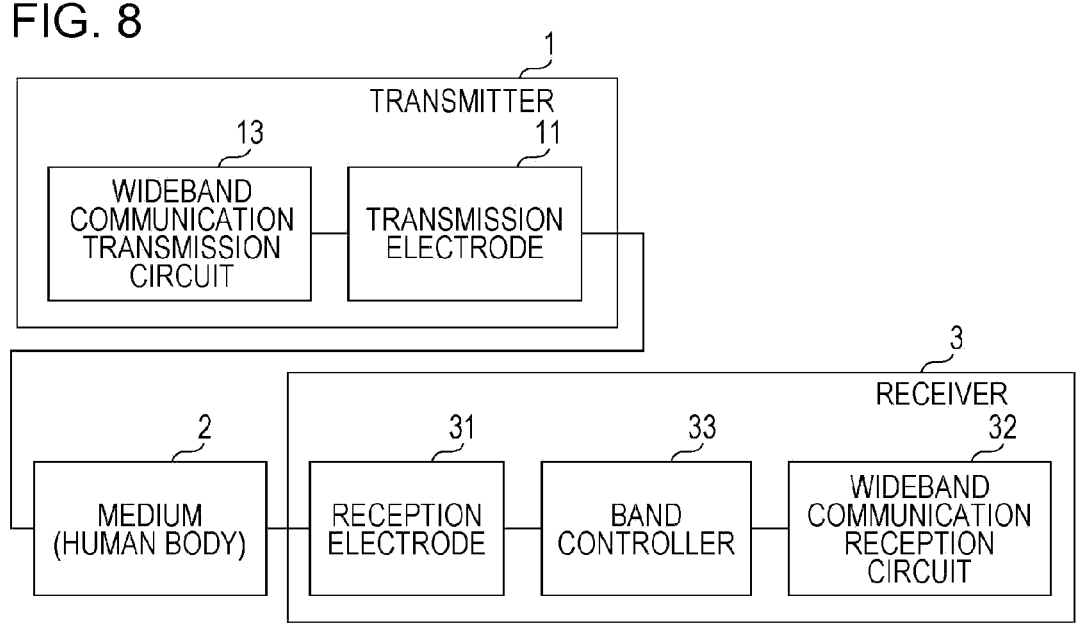
FIG. 8 is a schematic block diagram showing a communication system according to a fifth embodiment of the present invention.

FIG. 8 is a schematic block diagram showing a communication system according to a fifth embodiment of the present invention. The communication system shown in FIG. 8 mainly includes a transmission medium 2, a transmitter 1, and a receiver 3. The transmission medium 2 is, for example, a human body and transmits an information signal via an electric field. The transmitter 1 gives an electric field, obtained by modulating an information signal, to the transmission medium 2. The receiver 3 detects the electric field via the transmission medium 2 and demodulates the electric field into the information signal.

In the communication system, the transmitter 1 and the transmission medium (in this case, a human body) 2 are capacitively coupled to each other and the receiver 3 and the transmission medium (in this case, the human body) 2 are capacitively coupled to each other so as to transmit an information signal via an electric field obtained by modulating the information signal. In this case, although a displacement current flows through the transmission medium, no steady current flows therethrough. Thus, the transmission medium does not need to be electrically continuous. Thus, for example, even while the transmitter is in the user's pocket, the transmitter and the transmission medium are capacitively coupled to each other via thin cloth, thus making it possible to transmit the information signal.

The transmitter 1 gives an electric field, obtained by modulating an information signal, to the transmission medium 2. The transmitter 1 mainly includes a transmission electrode 11 and a wideband communication transmission circuit 13. The transmission electrode 11 faces the transmission medium 2 to give an electric field to the transmission medium 2. Since the wideband communication transmission circuit 13 is substantially the same as the wideband communication transmission circuit in the first embodiment, a detailed description thereof is omitted.

The receiver 3 detects the electric field via the transmission medium 2 to obtain a demodulation signal corresponding to the information signal. The receiver 3 may have a reception electrode 31, a band controller 33, and a wideband communication reception circuit 32. The reception electrode 31 faces the transmission medium 2 to receive an electric field from the transmission medium 2. The band controller 33 controls the band of an information signal for wideband communication. The wideband communication reception circuit 32 includes a detection circuit for detecting the electric field through amplification and a demodulation circuit for demodulating the information signal by using the detected physical quantity. Since the wideband communication reception circuit 32 is substantially the same as the wideband communication reception circuit in the first embodiment, a detailed description thereof is omitted.

The band controller 33 controls the band of an information signal for wideband communication. Specifically, when the transmission medium 2 is in contact with the reception electrode 31 and the transmission medium 2 and the reception electrode 31 are capacitively coupled to each other, the band controller 33 performs control to provide a band that is necessary for the receiver 3 to perform demodulation for the wideband communication, and when the transmission medium 2 is not in contact with the reception electrode 31, the band controller 33 performs control to provide a narrower band than the band that is necessary for the receiver 3 to perform demodulation for the wideband communication. That is, when the transmission medium 2 is not in contact with the reception electrode 31, the band controller 33 sets a filter unit so that it has a narrow band as shown in FIG. 2 (i.e., provide a signal in a narrowband at a level that cannot be demodulated by the receiver 3).

For communication in the communication system having the above-described configuration, when the transmission medium 2 is in contact with the transmission electrode 11, the wideband communication transmission circuit 13 in the transmitter 1 obtains a modulation signal by modulating a carrier with an information signal, the carrier having frequencies (several tens of kHz to several tens of MHz) at which the human body that is the transmission medium 2 exhibits conductivity, and further performs spread-spectrum modulation on the modulation signal to generate a signal for the wideband communication. The signal is amplified and is converted into a voltage change. Upon application of the voltage change to the transmission electrode 11 of the transmitter 1, an electric field corresponding to the modulation signal is generated around the transmission electrode 11. The electric field is then given to the human body. The electric field given to the human body is received by the reception electrode 31 in the receiver 3. When the electric field is applied to the reception electrode 31, the wideband communication reception circuit 32 detects the modulation signal and obtains the information signal through demodulation using the carrier used by the transmitter 1. In such a manner, the human body can be used as the transmission medium 2 to transmit/receive the information signal. With respect to the transmission electrode 11, communication can be performed even when the surface thereof is covered with an insulator.

On the other hand, when the transmission medium 2 is not in contact with the reception electrode 31, the band controller 33 in the receiver 3 performs control to provide a narrower band than the band necessary for demodulation for the wideband communication. That is, the band controller 33 converts a wideband signal, transmitted from the transmitter 1, into a signal in a narrow band at a level that cannot be demodulated by the receiver 3, as shown in FIG. 2. Thus, the receiver 3 cannot reproduce the information signal. When a baseband signal is spread-spectrum modulated, the resulting signal similarly has a narrow band at a level that cannot be demodulated (despread) and thus is not reproduced. Thus, the information signal cannot be obtained.

When the transmission medium 2 is not in contact with the reception electrode 31, the receiver 3 performs band control to provide a signal in a narrow band at a level that cannot be demodulated, as described above. Thus, even when multiple electric-field communication systems are installed at a short distance, it is possible to prevent interference with an adjacent electric-field communication system and it is also possible to prevent occurrence of error and malfunction.

Figure 9A:
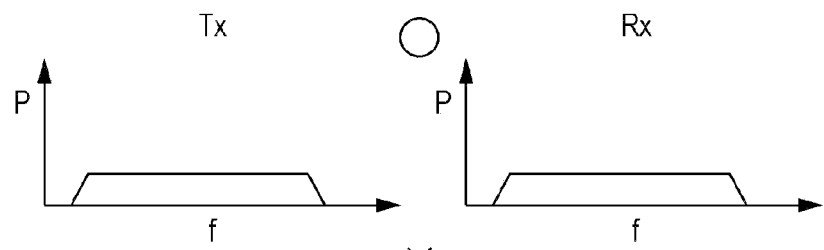
FIG. 9A to 9D are graphs each showing a relationship between a reception electric-field strength and a frequency when in contact with a transmission medium in the communication system according to the fifth embodiment of the present invention.
Figure 9B:
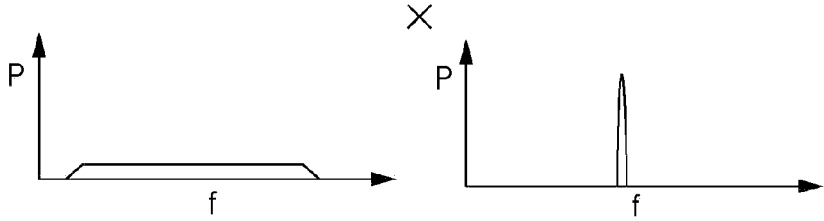
Figure 9C:
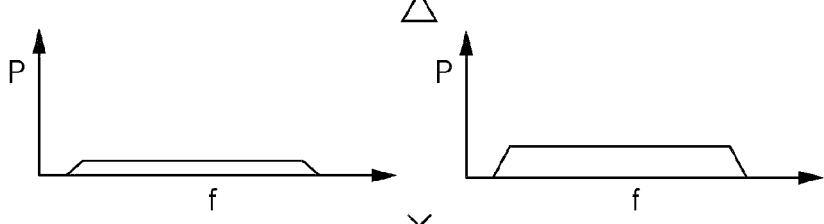
Figure 9D:
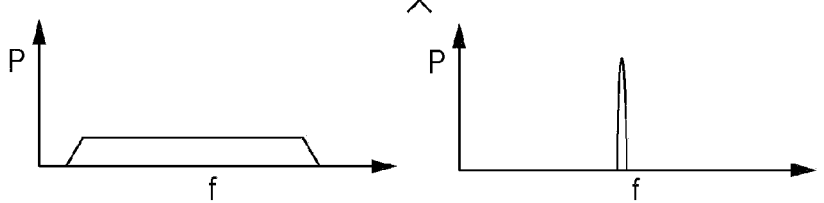

In this communication system, when the transmission medium 2 comes into contact with both the transmission electrode 11 and the reception electrode 31, the transmitter 1 does not perform band control for providing a signal in a narrow band at a level that cannot be demodulated by the receiver 3. Thus, as shown in FIG. 9A, the transmitter 1 and the receiver 3 transmit/receive a signal for wideband communication to allow the wideband communication (indicated by ◯). When the transmission medium 2 moves away from both of the transmission electrode 11 and the reception electrode 31, the band controller 33 in the receiver 3 performs band limitation so that the signal is in a narrow band at a level that cannot be demodulated. Consequently, as shown in FIG. 9B, the receiver 3 cannot demodulate the signal for the wideband communication and cannot perform the wideband communication (indicated by x). When the transmission medium 2 moves away from only the transmission electrode 11, no band limitation is performed at the transmitter 1 and the receiver 3. Thus, although wideband communication is possible, as shown in FIG. 9C, the band is not at a level at which an information signal can be practically transmitted (indicated by Δ). When the transmission medium 2 moves away from only the reception electrode 31, the band controller 33 in the receiver 3 performs band limitation so that the signal is in a narrow band at a level that cannot be demodulated. Consequently, as shown in FIG. 9D, the receiver 3 cannot demodulate the signal for the wideband communication and cannot perform the wideband communication (indicated by x).

In such a communication system, wideband communication can be efficiently disconnected when the transmission medium 2 moves away from the receiver 3. In such a communication system, since the transmitter has no band controller, wideband communication is possible even when the transmitter 1 is away from the transmission medium 2 to some extent. In FIGS. 9A to 9D, the vertical axis indicates the strength of a signal transmitted/received and the horizontal axis indicates a frequency.

The communication system may be used in, for example, a case in which a card or equipment (a transmitter) for transmitting ID information is carried in a pocket or the like and the ID information is transmitted only when in contact with the electrode of equipment (a receiver) for checking the ID information. In the communication system, when the transmission medium 2 moves away from the receiver 3, wideband communication can be efficiently disconnected as described above. Accordingly, when one's hand is merely brought closer to the receiver 3, no communication occurs and thus the security improves. Since transmitting may be slightly away, communication is possible even when it is in a pocket and coupling with a transmission medium is slightly reduced. Thus, it is user-friendly for the user. For such uses, the communication system is applicable to electronic ticket gates, ATMs (automated teller machines), credit cards, office entry/exit control, and various keys.

(Sixth Embodiment)

In the present embodiment, a description is given of a case in which a transmitter and a receiver perform band control. FIG. 10 is a schematic block diagram showing a communication system according to a sixth embodiment of the present invention. The communication system shown in FIG. 10 mainly includes a transmission medium 2, a transmitter 1, and a receiver 3. The transmission medium 2 is, for example, a human body and transmits an information signal via an electric field. The transmitter 1 gives an electric field, obtained by modulating an information signal, to the transmission medium 2. The receiver 3 detects the electric field via the transmission medium 2 and demodulates the electric field into the information signal.

In the communication system, the transmitter 1 and the transmission medium (in this case, a human body) 2 are capacitively coupled to each other and the receiver 3 and the transmission medium (in this case, the human body) 2 are capacitively coupled to each other so as to transmit an information signal via an electric field obtained by modulating the information signal. In this case, although a displacement current flows through the transmission medium, no steady current flows therethrough. Thus, the transmission medium does not need to be electrically continuous. Thus, for example, even while the transmitter is in the user's pocket, the transmitter and the transmission medium are capacitively coupled to each other via thin cloth, thus making it possible to transmit the information signal.

The transmitter 1 gives an electric field, obtained by modulating an information signal, to the transmission medium 2. The transmitter 1 mainly includes a transmission electrode 11 that faces the transmission medium 2 to give an electric field to the transmission medium 2, a band controller 12 that controls the band of the information signal for the wideband communication, and a wideband communication transmission circuit 13. The transmitter 1 has a wakeup-signal transmission circuit 14 for generating a wakeup signal controlled to be in a narrower band than the band necessary for demodulation for the wideband communication. Since the wideband communication transmission circuit 13 is substantially the same as the wideband communication transmission circuit in the first embodiment, a detailed description thereof is omitted.

The receiver 3 detects the electric field via the transmission medium 2 to obtain a demodulation signal corresponding to the information signal. The receiver 3 may have a reception electrode 31, a band controller 33, and a wideband communication reception circuit 32. The reception electrode 31 faces the transmission medium 2 to receive an electric field from the transmission medium 2. The band controller 33 controls the band of an information signal for the wideband communication. The wideband communication reception circuit 32 includes a detection circuit for detecting the electric field through amplification and a demodulation circuit for demodulating the information signal by using the detected physical quantity. The receiver 3 may have a wakeup-signal reception circuit 34 that monitors whether or not the reception electric-field strength of a wakeup signal exceeds a predetermined threshold. When the reception electric-field strength exceeds the predetermined threshold, the wakeup-signal reception circuit 34 activates the wideband communication reception circuit 32. Since the wideband communication reception circuit 32 is substantially the same as the wideband communication reception circuit in the first embodiment, a detailed description thereof is omitted.

Since the band controller 12 in the transmitter 1 is substantially the same as the band controller in the first embodiment, a detailed description thereof is omitted. Since the band controller 33 in the receiver 3 is substantially the same as the band controller in the fifth embodiment, a detailed description thereof is omitted. Since the operation of the transmitter 1 is also substantially the same as the operation in the first embodiment and the operation of the receiver 3 is substantially the same as the operation in the fifth embodiment, detailed descriptions thereof are omitted.

In a case in which the band controller 12 and the band controller 33 are provided in both of the transmitter 1 and the receiver 3, when the transmission medium 2, such as the human body, is away from the transmission electrode 11 or the reception electrode 31, the bands of both the transmitter 1 and the receiver 3 are narrowed and thus wideband communication is not established. When both of the band controller 12 in the transmitter 1 and the band controller 33 in the receiver 3 are adapted so that the frequency bands thereof converge to almost the same frequency band in a state in which they are away from the transmission medium 2, as described above, merely monitoring the reception electric-field strength at the receiver 1 makes it possible to recognize that the transmitter 3 is approaching. Thus, the transmitter 1 and/or the receiver 3 can be equipped with a wakeup function (i.e., a function for activating the wideband communication circuit on the basis of the reception electric-field strength of a band-limited signal (a wakeup signal)). Accordingly, the wideband communication circuit that consumes a large amount of power can be operated only when necessary and the battery life can be extended.

Preferably, when the band controller 12 or 33 has a resonator, the band is narrowed, i.e., the Q factor of the resonator is increased, the transmission efficiency of the transmitter 1 increases, and also the reception sensitivity of the receiver 3 increases. Thus, even when the distance between the transmitter 1 and the receiver 3 is large to some extent, the wakeup signal can be detected. Thus, the activation of the wideband communication circuit can be completed before the transmission medium 2, such as the human body, touches the transmission electrode 11 or the reception electrode 31. As a result, the battery life is extended and the communication system can be operated without causing stress to the user.

The wakeup function will be described with reference to FIG. 12. In the configuration shown in FIG. 10, a wakeup-signal transmission circuit 14 and a wakeup-signal reception circuit 34 (collectively referred to as "wideband communication circuits") which have simpler configurations and consume smaller amounts of power than the wideband communication transmission circuit 13 and the wideband communication reception circuit 32 are provided in the transmitter 1 and the receiver 3, respectively. In a sleep mode, the wideband communication transmission circuit 13 and the wideband communication reception circuit 32 which consume large amounts of power are put to sleep (in ST11), and the wakeup-signal transmission circuit 14, the wakeup-signal reception circuit 34, the band controllers 12 and 33 constituted by passive elements, the transmission electrode 11, and the reception electrode 31 are operated. The receiver 3 receives a wakeup signal transmitted from the transmitter 1 and performs monitoring (in ST12). The receiver 3 then determines whether or not the reception electric-field strength of the wakeup signal exceeds a predetermined threshold (in ST13). When the reception electric-field strength of the wakeup signal exceeds the predetermined threshold, the wideband communication transmission circuit 13 and the wideband communication reception circuit 32 are activated (in ST14). In general, the receiver 3 determines whether or not the reception electric-field strength of the wakeup signal exceeds the predetermined threshold, and first activates the wideband communication reception circuit 32 on the basis of the result of the determination. Thereafter, the receiver 3 transmits a control signal (for activating the wideband communication transmission circuit 13) to the transmitter 1 (in ST15). Upon receiving the control signal, the transmitter 1 activates the wideband communication transmission circuit 13 in accordance with the control signal. In light of the foregoing, it is desired that the transmitter 1 and the receiver 3 be capable of performing two-way communication.

In the configuration shown in FIG. 10, the wakeup-signal transmission circuit 14 and the wakeup-signal reception circuit 34 are provided in the transmitter 1 and the receiver 3, respectively. It is, however, sufficient as long as the receiver 3 can monitor the reception electric-field strength of the wakeup signal. Thus, without the additional provision of the wakeup-signal transmission circuit 14 and the wakeup-signal reception circuit 34, the arrangement may also be such that a signal in a band that is narrowed when the transmission medium 2 is away is handled as a wakeup signal and the wideband communication reception circuit 32 is equipped with a function for monitoring the reception electric-field strength of the signal in the narrowed band. In this case, putting the wideband communication transmission circuit 13 and the wideband communication reception circuit 32, except for the function for transmitting a signal in a narrowed band and the functional portion for monitoring the reception electric-field strength of a signal in a narrowed band, to sleep makes it possible to reduce the power consumption.

Figure 11A:
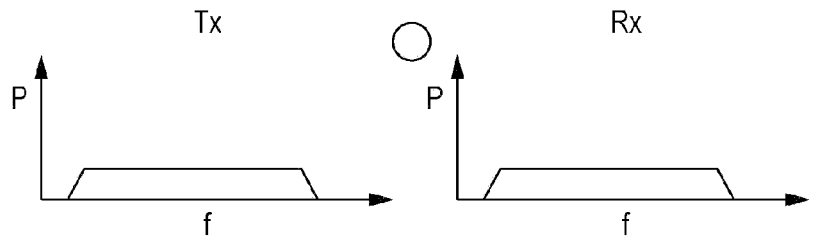
FIGS. 11A to 11D are graphs each showing a relationship between a reception electric-field strength and a frequency when in contact with a transmission medium in the communication system according to the sixth embodiment of the present invention.
Figure 11B:
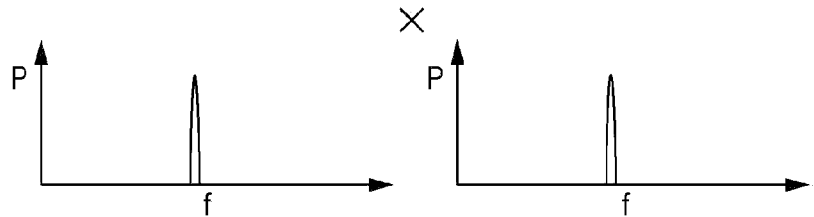
Figure 11C:
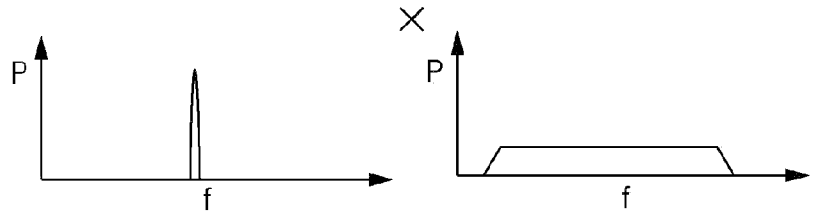
Figure 11D:
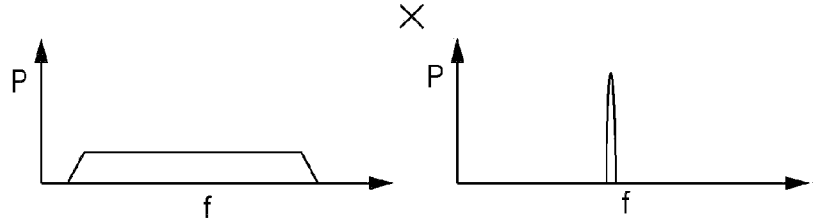

In this communication system, when the transmission medium 2 comes into contact with both the transmission electrode 11 and the reception electrode 31, the transmitter 1 does not perform band control for providing a signal in a narrow band at a level that cannot be demodulated by the receiver 3. Thus, as shown in FIG. 11A, the transmitter 1 and the receiver 3 transmit/receive a signal for wideband communication to allow the wideband communication (indicated by ◯). When the transmission medium 2 moves away from both of the transmission electrode 11 and the reception electrode 31, the band controller 12 in the transmitter 1 transmits a wakeup signal and the receiver 3 monitors the wakeup signal to determine whether or not it exceeds the threshold. Thus, it is possible to perform a wakeup operation, as shown in FIG. 11B. In this case, the receiver 3 cannot demodulate a signal for the wideband communication and thus cannot perform the wideband communication (indicated by x). When the transmission medium 2 moves away from only the transmission electrode 11, the band controller 12 in the transmitter 1 performs band limitation to provide a signal in a narrow band at a level that cannot be demodulated by the receiver 3. Thus, as shown in FIG. 11C, the receiver 3 cannot demodulate the signal for the wideband communication and cannot perform the wideband communication (indicated by x). When the transmission medium 2 moves away from only the reception electrode 31, the band controller 33 in the receiver 3 performs band limitation to provide a signal in a narrow band at a level that cannot be demodulated. Consequently, as shown in FIG. 11D, the receiver 3 cannot demodulate the signal for the wideband communication and cannot perform the wideband communication (indicated by x).

In such a communication system, wideband communication can be efficiently disconnected in both of the case in which the transmission medium 2 moves away from the transmitter 1 and the case in which the transmission medium 2 moves away from the receiver 3. In FIGS. 11A to 11D, the vertical axis indicates the strength of a signal transmitted/received and the horizontal axis indicates a frequency.

The communication system may be used in a case in which it is applied to communication between pieces of equipment with touch panel inputs and information is copied from equipment A to equipment B. In this case, the user can transfer information via the human body by selecting, with a touch panel, the information he or she desires to copy from multiple files in the equipment A and selecting, from folders in the equipment B, a folder into which he or she desires to store the information. As described above, in both of the case in which the transmission medium moves away from the transmitter and the case in which the transmission medium moves away from the receiver, wideband communication can be efficiently disconnected and thus an undesired operation is less likely to occur. Conceivable examples include transfer of data between pieces of equipment, such as PCs (personal computers), game equipment, and mobile phones, and video games utilizing the function for efficiently disconnecting wideband communication. The communication system is also applicable to, for example, a case in which a single touch panel or handwriting-input device is shared by multiple pieces of equipment and the user touches, with his/her left hand, the equipment to which he or she desires to transmit a signal, while inputting the signal with his/her right hand.

In particular, examples of uses taking advantage of the wakeup function include various types of card for which extension of the battery life through reduction of power consumption is desirable, cards for automatic ticket gates, and entry/exit control cards that also serve as employee ID cards, various types of furniture associated with office security, cards that serve as keys for other equipment, ATM cards, and credit cards. In this case, when the wideband communication circuit is configured as a transmittable and receivable circuit and a two-way communication is performed between the transmitter 1 and the receiver 3, either thereof can execute the wakeup function. Such a configuration is more suitable for uses, such as automatic ticket gates.

In the communication system according to the present invention, since the transmitter 1 and/or the receiver 3 may have a band controller for controlling the band of the information signal for the wideband communication, stable communication with high noise tolerance is performed when in contact with the electrode and an undesired communication can be prevented when not in contact.

The present invention is not limited to the first to sixth embodiments described above, and various changes can be made thereto. For example, although the spread-spectrum communication has been described as the wideband communication in the first to sixth embodiments described above, the present invention is not limited thereto. For example, a multi-carrier transmission technology for an OFDM (orthogonal frequency division multiplexing) communication or the like may be used as the wideband communication and a UWB (ultra wide band) signal for impulse radio or the like or an wideband analog signal (such as FM) may also be used.

The configurations of the modulation circuit and the conversion circuit in the transmitter, the detection circuit and the demodulation circuit in the receiver, and so on in the above-described embodiments are not limiting and can be modified as needed. The dimensions, numeric values, and so on in the above-described embodiments are not particularly limiting and can be changed within the scope of the present invention. In addition, changes can be appropriately made without departing from the scope of the present invention.

What is claimed is:

1. A communication system for wideband communications, comprising:
   a transmitter configured to apply an electric field to a transmission medium, the electric field corresponding to a voltage signal obtained by a wideband modulation of an information signal; and
   a receiver configured to detect the electric field from the transmission medium and obtain a demodulation signal corresponding to the information signal by a wideband demodulation;
   wherein the transmitter includes:
      a transmission electrode configured to apply the electric field to the communication medium by capacitively coupling to the transmission medium;
      a transmission circuit configured to output the voltage signal corresponding to the information signal; and
      a first frequency band controller coupled to the transmission circuit, configured to control a frequency band of the voltage signal to be supplied to the transmission electrode, and
   wherein, if the transmission medium is in contact with the transmission electrode, the first frequency band controller provides the voltage signal with a first bandwidth that allows the receiver to perform the wideband demodulation, and if the transmission medium is not in contact with the transmission electrode, the first frequency band controller provides the voltage signal with a second bandwidth narrower than the first bandwidth, the second bandwidth not allowing the receiver to perform the wideband demodulation,
   and wherein the first-frequency band controller has a resonator, and performs a resonance control so that, if the transmission medium is in contact with the transmission electrode, a Q factor of the resonator has a first value, and if the transmission medium is not in contact with the transmission electrode, the Q factor of the resonator has a second value hither than the first value.

2. The communication system according to claim 1, wherein the receiver includes:
   a reception electrode configured to receive a signal corresponding to the information signal by capacitively coupling to the communication medium;
   a reception circuit configured to demodulate the received signal to obtain the information signal; and
   a second frequency band controller configured to control a bandwidth of the received signal to be supplied to the reception circuit,
   wherein, if the transmission medium is in contact with the reception electrode, the second frequency band controller provides the received signal with a third bandwidth that allows—the reception circuit to perform the wideband demodulation to obtain the information signal, and if the transmission medium is not in contact with the reception electrode, the second frequency band controller provides the received signal with a fourth bandwidth narrower than the third bandwidth, the fourth bandwidth not allowing the reception circuit to perform the wideband demodulation.

3. A communication system for wideband communications, comprising:
  a transmitter configured to apply an electric field to a transmission medium, the electric field corresponding to a voltage signal obtained by a wideband modulation of an information signal; and
  a receiver configured to detect the electric field from the transmission medium and obtain a demodulation signal corresponding to the information signal by a wideband demodulation;
  wherein the receiver includes:
    a reception electrode configured to receive a signal corresponding to the information signal from the communication medium by capacitively coupling to the communication medium;
    a reception circuit configured to obtain the information signal from the received signal by the wideband demodulation; and
    a second frequency band controller configured to control a bandwidth of the received signal to be supplied to the reception circuit,
  wherein, if the transmission medium is in contact with the reception electrode, the second frequency band controller provides the received signal with a third bandwidth that allows the reception circuit to perform the wideband demodulation, and if the transmission medium is not in contact with the reception electrode, the second frequency band controller provides the received signal with a fourth bandwidth narrower than the third bandwidth, the fourth bandwidth not allowing the reception circuit to perform the wideband demodulation,
  and wherein the second frequency band controller has a resonator, and performs a resonance control so that, if the transmission medium is in contact with the reception electrode, a Q factor of the resonator has a third value, and if the transmission medium is not in contact with the reception electrode, the Q factor of the resonator has a fourth value higher than the third value.

4. The communication system according to claim 1, wherein the first frequency band controller has a resonator, and performs a resonant frequency control so that, if the transmission medium is in contact with the transmission electrode, a resonant frequency of the resonator is apart from a frequency band necessary for the wideband demodulation, and if the transmission medium is not in contact with the transmission electrode, the resonant frequency is close to the frequency band necessary for the wideband demodulation.

5. The communication system according to claim 3, wherein the second frequency band controller has a resonator, and performs a resonant frequency control so that, if the transmission medium is in contact with the reception electrode, a resonant frequency of the resonator is apart from a frequency band necessary for the wideband demodulation, and if the transmission medium is not in contact with the reception electrode, the resonant frequency is close to the frequency band necessary for the wideband demodulation.

6. The communication system according to claim 1, wherein the first frequency band controller has a resonator having multiple resonant peaks, and performs a resonant peak control so that, if the transmission medium is in contact with the transmission electrode, the resonator has the multiple resonant peaks in the vicinity of a frequency band necessary for the wideband demodulation, and if the transmission medium is not in contact with the transmission electrode, a number of resonant peaks that are present in the vicinity of the frequency band necessary for the wideband demodulation is reduced.

7. The communication system according to claim 3, wherein the second frequency band controller has a resonator having multiple resonant peaks, and performs a resonant peak control so that, if the transmission medium is in contact with the reception electrode, the resonator has the multiple resonant peaks in the vicinity of a frequency band necessary for the wideband demodulation, and if the transmission medium is not in contact with the reception electrode, a number of resonant peaks that are present in the vicinity of the frequency band necessary for the wideband demodulation is reduced.

8. The communication system according to claim 1, wherein the first frequency band controller has a resonator having multiple resonant peaks, and performs a resonant peak control so that, if the transmission medium is in contact with the transmission electrode the resonant peaks are separated from each other within a frequency band necessary for the wideband demodulation, and if the transmission medium is not in contact with the transmission electrode the multiple resonant peaks are close to each other within the frequency band necessary for the wideband demodulation.

9. The communication system according to claim 3, wherein the second frequency band controller has a resonator having multiple resonant peaks, and performs a resonant peak control so that, if the transmission medium is in contact with the reception electrode the resonant peaks are separated from each other within a frequency band necessary for the wideband demodulation, and if the transmission medium is not in contact with the reception electrode, the multiple resonant peaks are close to each other within the frequency band necessary for the wideband demodulation.

10. The communication system according to claim 2,
  wherein the transmitter further includes:
    a wakeup-signal transmission circuit configured to transmit a wakeup-signal having bandwidth narrower than a bandwidth necessary for the wideband demodulation,
  and wherein the receiver further includes:
    a wakeup-signal reception circuit configured to monitor a reception strength of the wakeup signal received by the receiver and activate the reception circuit if the reception strength of the wakeup signal exceeds a predetermined threshold.

11. The communication system according to claim 3,
  wherein the transmitter further includes:
    a wakeup-signal transmission circuit configured to transmit a wakeup-signal having a bandwidth narrower than a bandwidth necessary for the wideband demodulation,
  and wherein the receiver further includes:
    a wakeup-signal reception circuit configured to monitor a reception of the wakeup signal received by the receiver and activate the reception circuit if the reception strength of the wakeup signal exceeds a predetermined threshold.

12. A transmitter for a communication system for wideband communications, the transmitter comprising:
  a transmission circuit configured to generate a voltage signal corresponding to an information signal using a wideband modulation;
  a transmission electrode configured to apply an electric filed to a transmission medium by capacitively coupling to the transmission medium, the electric field corresponding to the voltage signal; and a frequency band controller coupled to the transmission circuit, configured to control a frequency band of the voltage signal to be supplied to the transmission electrode, wherein the frequency band controller provides the voltage signal with a first bandwidth if the transmission medium is in contact with the transmission electrode, the first band width allowing a wideband demodulation at a receiver, wherein the frequency band controller provides the voltage signal with a second bandwidth narrower than the first bandwidth, if the transmission medium is not in contact with the transmission electrode, the second bandwidth not allowing the wideband demodulation at the receiver, and wherein the frequency band controller includes a resonator, the frequency band controller being configured to perform a Q factor control such that a Q factor of the resonator has a first value if the transmission medium is in contact with the transmission electrode, and that the Q factor has a second value hither than the first value if the transmission medium is not in contact with the transmission electrode.

13. The transmitter according to claim 12, wherein the frequency band controller is further configured to perform one of:

a resonant frequency control such that a resonant frequency of the resonator is apart from a frequency band for the wideband demodulation if the transmission medium is in contact with the transmission electrode, and that the resonant frequency is close to the frequency band for the wideband demodulation if the transmission medium is not in contact with the transmission electrode;

a first resonant peak control such that the resonator has a multiple resonant peaks in the vicinity of the frequency band for the wideband demodulation if the transmission medium is in contact with the transmission electrode, and that a number of the resonant peaks present in the vicinity of the frequency band for the wideband demodulation is reduced if the transmission medium is not in contact with the transmission electrode; and a second resonant peak control such that the resonator has a multiple resonant peaks which are separated from each other within the frequency band for the wideband demodulation if the transmission medium is in contact with the transmission electrode, and that the multiple resonant peaks are close to each other within the frequency band for the wideband demodulation if the transmission medium is not in contact with the transmission electrode.

14. The transmitter according to claim 12, further including:

a wakeup-signal transmission circuit configured to transmit a wakeup signal having a bandwidth narrower than a bandwidth for the wideband demodulation.

15. The transmitter according to claim 14, wherein the wakeup signal is the voltage signal having the second bandwidth provided by the frequency band controller.

16. A receiver for a communication system for wideband communications, the receiver comprising:

a reception electrode configured to receive a signal corresponding to an information signal by capacitively coupling to a communication medium;

a reception circuit configured to obtain the information signal from the received signal using a wideband demodulation; and a frequency band controller configured to control a bandwidth of the received signal to be supplied to the reception circuit, wherein the frequency band controller provides the received signal with a third bandwidth that allows the reception circuit to perform the wideband demodulation, if the transmission medium is in contact with the reception electrode, wherein the second frequency band controller provides the received signal with a fourth bandwidth narrower than the third bandwidth, if the transmission medium is not in contact with the reception electrode, the fourth bandwidth not allowing the reception circuit to perform the wideband demodulation, and wherein the frequency band controller includes a resonator, the frequency band controller being configured to perform a Q factor control such that a Q factor of the resonator has a first value if the transmission medium is in contact with the reception electrode, and that the Q factor has a second value hither than the first value if the transmission medium is not in contact with the reception electrode.

17. The receiver according to claim 16, wherein the frequency band controller is further configured to perform one of:

a resonant frequency control such that a resonant frequency of the resonator is apart from a frequency band for the wideband demodulation if the transmission medium is in contact with the reception electrode, and that the resonant frequency is close to the frequency band for the wideband demodulation if the transmission medium is not in contact with the reception electrode;

a first resonant peak control such that the resonator has a multiple resonant peaks in the vicinity of the frequency band for the wideband demodulation if the transmission medium is in contact with the reception electrode, and that a number of the resonant peaks present in the vicinity of the frequency band for the wideband demodulation is reduced if the transmission medium is not in contact with the reception electrode; and a second resonant peak control such that the resonator has a multiple resonant peaks which are separated from each other within the frequency band for the wideband demodulation if the transmission medium is in contact with the reception electrode, and that the multiple resonant peaks are close to each other within the frequency band for the wideband demodulation if the transmission medium is not in contact with the reception electrode.

18. The receiver according to claim 16, further including:

a wakeup-signal reception circuit configured to monitor a strength of a wakeup signal received by the receiver and activate the reception circuit if the reception strength of the wakeup signal exceeds a predetermined threshold, the wakeup-signal having a bandwidth narrower than a bandwidth for the wideband demodulation.

* * * * *